United States Patent
Nakazato et al.

(10) Patent No.: US 11,215,937 B2
(45) Date of Patent: Jan. 4, 2022

(54) CHARGING ROLL OR DEVELOPING ROLL FOR ELECTROPHOTOGRAPHIC DEVICE

(71) Applicant: Sumitomo Riko Company Limited, Aichi (JP)

(72) Inventors: Kenta Nakazato, Aichi (JP); Shimpei Miyagawa, Aichi (JP); Takeru Horiuchi, Aichi (JP); Naoki Akira, Aichi (JP); Takenori Saito, Aichi (JP); Yoshihiro Saito, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 0 days.

(21) Appl. No.: 17/226,057

(22) Filed: Apr. 8, 2021

(65) Prior Publication Data

US 2021/0232058 A1     Jul. 29, 2021

Related U.S. Application Data

(63) Continuation of application No. PCT/JP2020/029195, filed on Jul. 30, 2020.

(30) Foreign Application Priority Data

Jul. 30, 2019  (JP) .............................. JP2019-139955

(51) Int. Cl.
*G03G 15/02* (2006.01)
*C09D 109/00* (2006.01)
(Continued)

(52) U.S. Cl.
CPC ....... *G03G 15/0233* (2013.01); *C09D 109/00* (2013.01); *C09D 109/02* (2013.01); *F16C 13/00* (2013.01); *G03G 15/0808* (2013.01)

(58) Field of Classification Search
CPC .............. G03G 15/0233; G03G 15/06; G03G 15/0806; G03G 15/0808; G03G 2215/0617; G03G 2215/0634; G03G 2215/00683
(Continued)

(56) References Cited

U.S. PATENT DOCUMENTS 6,918,866 B2 * 7/2005 Miyamori .......... G03G 15/0233
                                                                                  492/49
8,768,226 B2    7/2014 Koyanagi et al.
(Continued)

FOREIGN PATENT DOCUMENTS

JP          2004245863          9/2004
JP          2004306519          11/2004
(Continued)

OTHER PUBLICATIONS

"International Search Report (Form PCT/ISA/210) of PCT/JP2020/029195," dated Sep. 15, 2020, with English translation thereof, pp. 1-6.

*Primary Examiner* — Hoan H Tran
(74) *Attorney, Agent, or Firm* — JCIPRNET

(57) ABSTRACT

An elastic body layer is composed of a conductive rubber composition containing an isoprene rubber, a rubber other than the isoprene rubber, and carbon black. The elastic body layer is phase-separated into a first rubber phase containing the isoprene rubber and a second rubber phase containing the rubber other than the isoprene rubber; in the range of a 5 μm×5 μm square of an arbitrary cross section of the elastic body layer, the area ratio of the first rubber phase is within a range of 10 to 90%. The resistance value of the elastic body layer is within a range of $1.0 \times 10^3$ to $1.0 \times 10^6 \Omega$. A surface layer contains an electronic conductive agent and a crosslinked body of at least one polyurethane resin of an ether polyurethane resin and a carbonate polyurethane resin, and the glass transition point of the surface layer is within a range of −10 to −70° C.

2 Claims, 1 Drawing Sheet

(51) Int. Cl.
*C09D 109/02* (2006.01)
*F16C 13/00* (2006.01)
*G03G 15/08* (2006.01)

(58) Field of Classification Search
USPC ....... 399/176, 284, 286; 428/18, 147, 319.7, 428/492, 704; 492/50, 56
See application file for complete search history.

(56) References Cited

U.S. PATENT DOCUMENTS

| | | | | |
|---|---|---|---|---|
| 9,098,007 | B2* | 8/2015 | Rokutan | ............ G03G 15/0233 |
| 9,964,914 | B2* | 5/2018 | Arimura | .................... B32B 7/12 |
| 10,139,747 | B2* | 11/2018 | Yamada | ............. G03G 15/0233 |

FOREIGN PATENT DOCUMENTS

| | | |
|---|---|---|
| JP | 2005115204 | 4/2005 |
| JP | 2013041264 | 2/2013 |
| JP | 2016188910 | 11/2016 |

\* cited by examiner

CHARGING ROLL OR DEVELOPING ROLL FOR ELECTROPHOTOGRAPHIC DEVICE

CROSS-REFERENCE TO RELATED APPLICATIONS

This application is a continuation application of International Application number PCT/JP2020/029195 on Jul. 30, 2020, which claims the priority benefit of Japan Patent Application No. 2019-139955, filed on Jul. 30, 2019. The entirety of each of the above-mentioned patent applications is hereby incorporated by reference herein and made a part of this specification.

BACKGROUND

Technical Field

The present disclosure relates to a charging roll or developing roll for an electrophotographic device which is suitably used in an electrophotographic device such as a copier, a printer, a facsimile or the like that employs electrophotography.

Related Art

In an electrophotographic device such as a copier, a printer, a facsimile or the like that employs electrophotography, a conductive roll such as a charging roll, a developing roll, a transfer roll, a toner supply roll or the like is arranged around a photosensitive drum. A conductive roll is known which has a conductive elastic body layer on the outer periphery of a shaft body made of core metal, and has a surface layer on the outer periphery of the elastic body layer.

LITERATURE OF RELATED ART

Patent Literature

Patent literature 1: Japanese Patent Laid-open No. 2005-115204

Conventionally, in the elastic body layer of the conductive roll, an ionic conductive agent may be used as a conductive agent in order not to generate a leak discharge. However, if the conductive agent of the elastic body layer is an ionic conductive agent, the resistance may be highly environment-dependent, and an image adverse effect caused by environment dependence may occur. On the other hand, if the conductive agent of the elastic body layer is an electronic conductive agent, the environment dependence of the resistance can be suppressed to be small and the image adverse effect caused by the environment dependence can be suppressed, but an image adverse effect caused by the leak discharge may not be suppressed.

The problem to be solved by the present disclosure is to provide a conductive roll for an electrophotographic device capable of suppressing an image adverse effect caused by a leak discharge and suppressing environment dependence of resistance.

SUMMARY

A charging roll or developing roll for an electrophotographic device according to the present disclosure includes a shaft body, an elastic body layer formed on the outer periphery of the shaft body, and a surface layer formed on the outer periphery of the elastic body layer; the elastic body layer is composed of a conductive rubber composition containing an isoprene rubber, a rubber other than the isoprene rubber, and carbon black; the elastic body layer is phase-separated into a first rubber phase containing the isoprene rubber and a second rubber phase containing a rubber other than the isoprene rubber; in the range of a 5 μm×5 μm square of an arbitrary cross section of the elastic body layer, the area ratio of the first rubber phase with respect to a total of the first rubber phase and the second rubber phase is within a range of 10 to 90%; the resistance value of the elastic body layer is within a range of $1.0\times10^3$ to $1.0\times10^6 \Omega$; and the surface layer contains an electronic conductive agent and a crosslinked body of at least one polyurethane resin of an ether polyurethane resin and a carbonate polyurethane resin, and the glass transition point of the surface layer is within a range of −10 to −70° C.

The polyurethane resin of the surface layer is preferably an aqueous polyurethane resin. The surface layer preferably further contains an associative thickener. The rubber other than the isoprene rubber is preferably a polar rubber. The rubber other than the isoprene rubber is preferably an acrylonitrile butadiene rubber. It is preferable that the carbon black is eccentrically located in the second rubber phase than in the first rubber phase. A surface roughness Sa of the elastic body layer is preferably 0.05 to 1.6 μm. It is preferable that the surface layer contains particles for roughness formation, a line roughness Rz at a portion of the surface layer containing the particles for roughness formation is 5.0 to 15.0 μm, and a product Sz·Sm of the surface roughness Sz and the line roughness Sm at a portion of the surface layer that does not contain the particles for roughness formation is 7.5 to 250 μm.

DESCRIPTION OF THE EMBODIMENTS

According to the charging roll or developing roll for an electrophotographic device of the present disclosure, the elastic body layer has low resistance and excellent resistance uniformity, the glass transition point of the surface layer is low, the crystal component of the polyurethane resin that is a binder is small, and thus an image adverse effect caused by a leak discharge can be suppressed. In addition, because the carbon black is used as a conductive agent of the elastic body layer, the environment dependence of resistance can also be suppressed.

If the polyurethane resin of the surface layer is an aqueous polyurethane resin, a water-based coating can be used as a material for forming the surface layer, and the environment can be considered. Besides, if the surface layer further contains an associative thickener, the associative thickener forms a crosslinked structure that crosslinks between the electronic conductive agents of the surface layer, and the dispersibility of the electronic conductive agent in the surface layer can be improved. Besides, if the rubber other than the isoprene rubber is a polar rubber, the resistance of the elastic body layer can be reduced. In addition, if the rubber other than the isoprene rubber is an acrylonitrile butadiene rubber, the resistance of the elastic body layer can be reduced. Besides, the carbon black is eccentrically located in the second rubber phase than in the first rubber phase, and thereby low hardness and low settling are likely to be exhibited. Besides, if the surface roughness Sa of the elastic body layer is within the above range, it is more excellent in an effect of suppressing the image adverse effect caused by the leak discharge. In addition, if the line roughness Rz of the surface layer, and the product Sz·Sm of the surface roughness Sz and the line roughness Sm are within the above range, it is more excellent in an effect of suppressing the image adverse effect caused by the leak discharge.

Figure 1A:
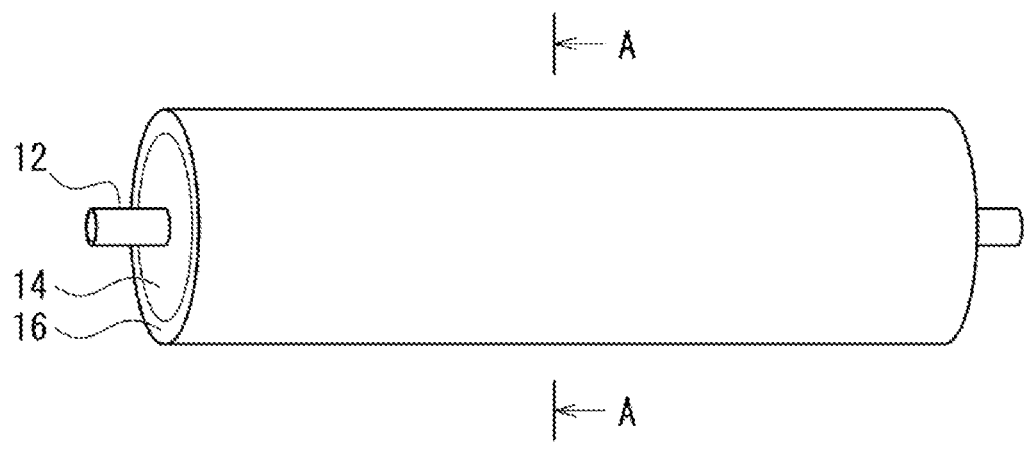
FIG. 1(a) is a schematic external view of a charging roll or developing roll for an electrophotographic device according to an embodiment of the present disclosure.
Figure 1B:
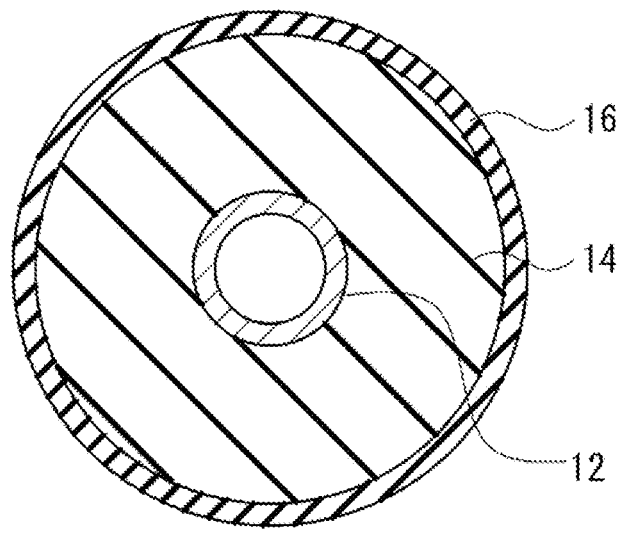
FIG. 1(b) is a cross-sectional view taken along line A-A of the charging roll or developing roll for an electrophotographic device according to the embodiment of the present disclosure.

A conductive roll for an electrophotographic device (hereinafter, sometimes simply referred to as a conductive roll) according to the present disclosure is described in detail. FIG. 1(a) is a schematic external view of the conductive roll for an electrophotographic device according to an embodiment of the present disclosure, and FIG. 1(b) is a cross-sectional view taken along line A-A of the conductive roll for an electrophotographic device according to the embodiment of the present disclosure.

A conductive roll 10 includes a shaft body 12, an elastic body layer 14 formed on the outer periphery of the shaft body 12, and a surface layer 16 formed on the outer periphery of the elastic body layer 14. The elastic body layer 14 is a layer (base layer) that is a base of the conductive roll 10. The surface layer 16 is a layer that appears on the surface of the conductive roll 10. In addition, although not particularly shown, an intermediate layer such as a resistance adjusting layer and the like may be formed between the elastic body layer 14 and the surface layer 16, if necessary.

The elastic body layer 14 is composed of a conductive rubber composition containing an isoprene rubber, a rubber other than the isoprene rubber, and carbon black. The elastic body layer 14 contains the carbon black as a conductive agent, and thereby the environment dependence of resistance can be suppressed. The isoprene rubber here includes a hydrogenated isoprene rubber. By containing the isoprene rubber, the elastic body layer 14 can be made low in hardness and hard to settle. The isoprene rubber is low polarity (non-polarity) and has high resistance. Therefore, if the rubber of the elastic body layer 14 is only an isoprene rubber, the resistance of the elastic body layer 14 cannot be easily lowered. Thus, the rubber other than the isoprene rubber, which has a higher polarity than the isoprene rubber or is easier to mix with the carbon black than the isoprene rubber, is used in combination with the isoprene rubber. That is, the property of the isoprene rubber is ensured, the rubber other than the isoprene rubber is blended, and the resistance is reduced by the rubber other than the isoprene rubber. The rubber other than the isoprene rubber may be a polar rubber, a non-polar rubber, or a combination of the polar rubber and the non-polar rubber. From the viewpoint of reducing the resistance of the elastic body layer 14 by the rubber other than the isoprene rubber, the rubber other than the isoprene rubber is preferably the polar rubber, or a combination of the polar rubber and the non-polar rubber.

The polar rubber listed as the rubber other than the isoprene rubber is a rubber having a polar group. The polar group may be a chloro group, a nitrile group, a carboxyl group, an epoxy group, and the like. The polar rubber may be hydrin rubber, nitrile rubber (NBR), urethane rubber (U), acrylic rubber (copolymer of acrylic acid ester and 2-chloroethyl vinyl ether, ACM), chloroprene rubber (CR), and the like. The hydrin rubber may be epichlorohydrin homopolymer (CO), epichlorohydrin-ethylene oxide binary copolymer (ECO), epichlorohydrin-allyl glycidyl ether binary copolymer (GCO), epichlorohydrin-ethylene oxide-allyl glycidyl ether ternary copolymer (GECO), and the like. These rubbers may be used alone, or two or more of the rubbers may be used in combination as the polar rubber. Among these rubbers, the hydrin rubber and the nitrile rubber (NBR) are preferable from the viewpoint of lower resistance and the like.

The non-polar rubber listed as the rubber other than the isoprene rubber is a rubber having no polar group. The polar group may be a chloro group, a nitrile group, a carboxyl group, an epoxy group, and the like. The non-polar rubber may be natural rubber (NR), butadiene rubber (BR), styrene-butadiene rubber (SBR), butyl rubber (IIR), ethylene-propylene rubber (EPM), ethylene-propylene-diene ternary copolymer rubber (EPDM), silicone rubber (Q), and the like. These rubbers may be used alone, or two or more of the rubbers may be used in combination as the non-polar rubber.

The elastic body layer 14 containing the isoprene rubber and the rubber other than the isoprene rubber is phase-separated into a phase (first rubber phase) containing the isoprene rubber and a phase (second rubber phase) containing the rubber other than the isoprene rubber. Besides, in the range of a 5 μm×5 μm square of an arbitrary cross section of the elastic body layer 14, the area ratio of the first rubber phase with respect to a total of the first rubber phase and the second rubber phase is within a range of 10 to 90%. In addition, relatively, the area ratio of the second rubber phase with respect to the total of the first rubber phase and the second rubber phase is within 10 to 90%. Here, "arbitrary" means any part of the elastic body layer 14. Both the area ratio of the first rubber phase and the area ratio of the second rubber phase refer to the area ratio in the range of a 5 μm×5 μm square of an arbitrary cross section. Specifically, an arbitrary cross section of the elastic body layer 14 is observed, an arbitrary range of a 40 μm×40 μm square in the cross section is divided into 64 parts, 16 masses that intersect and line up diagonally are selected, the area ratio of the first rubber phase (or the second rubber phase) in each 5 μm×5 μm square is measured respectively, and the area ratio is a value corresponding to 14 masses or more (85% or more) of the selected 16 masses. The two phases are uniformly dispersed (finely dispersed) to the extent that the two phases rather than only one of the first rubber phase and the second rubber phase exist in the minute range of a 5 μm×5 μm square. Thereby, because each of the property of the first rubber phase and the property of the second rubber phase becomes uniform in the elastic body layer 14, the resistance uniformity is also excellent. In order to finely disperse both the first rubber phase and the second rubber phase, for example, it is conceivable to use methods such as sufficiently kneading the phases to a desired dispersion, adjusting the blending ratio of the isoprene rubber and the rubber other than the isoprene rubber, using a compatibilizing agent for improving the dispersibility of both the first rubber phase and the second rubber phase, and the like.

From the viewpoint of uniform dispersibility of both phases, the area ratio of the first rubber phase is more preferably in a range of 20 to 80%, further preferably in a range of 30 to 70%, and particularly preferably in a range of 40 to 60%.

From the viewpoint that both the first rubber phase and the second rubber phase are easily uniformly dispersed (finely dispersed) and the like, in terms of mass ratio, the blending ratio of an isoprene rubber (a) and a rubber (b) other than the isoprene rubber is preferably in a range of a/b=10/90 to 90/10, more preferably in a range of a/b=20/80 to 80/20, further preferably in a range of a/b=30/70 to 70/30, and particularly preferably in a range of a/b=40/60 to 60/40.

The compatibilizing agent has a role of a surfactant, and for example, is an agent that can prevent phase separation of the first rubber phase and the second rubber phase during a manufacturing process and the like. Because the compatibilizing agent has an affinity for each phase of both phases that are immiscible with each other, the compatibilizing agent may be contained in each phase as well. The compatibilizing agent is a polymer different from both a base rubber of the first rubber phase and a base rubber of the second rubber phase. The compatibilizing agent is composed of a polymer containing either one or both of the constituent component of the base rubber contained in the first rubber phase and the constituent component of the base rubber contained in the second rubber phase. The constituent component of the compatibilizing agent may be an acrylonitrile-butadiene copolymer block, a polyisoprene block, a block composed of a modified natural rubber component, a block composed of a modified polyisoprene component, and the like. The compatibilizing agent may be, for example, a polymer having one of the above constituent components, or a polymer having two or more of the above constituent components. If the compatibilizing agent is a polymer having at least one block of the above constituent components, further lower hardness and lower settling are obtained.

The polymer having a block composed of a modified natural rubber component may be a modified natural rubber. The modified natural rubber may be an epoxidized natural rubber, a chlorinated natural rubber, a nitriled natural rubber (acrylonitriled natural rubber), and the like. The polymer having a block composed of a modified polyisoprene component may be a modified isoprene rubber. The modified isoprene rubber may be an epoxidized isoprene rubber, a chlorinated isoprene rubber, a nitriled isoprene rubber (acrylonitriled isoprene rubber), a maleic acid modified isoprene rubber, a (meth)acrylic acid modified isoprene rubber, and the like.

The compatibilizing agent may be composed of a polymer containing both the constituent component of the base rubber contained in the first rubber phase and the constituent component of the base rubber contained in the second rubber phase. This polymer may be a block composed of a nitrile rubber component, a block composed of an isoprene rubber component, and the like.

As the compatibilizing agent, one of the above polymers may be used alone, or two or more of the above polymers may be used in combination. From the viewpoint of a particularly excellent compatibilization effect, the epoxidized natural rubber and the epoxidized isoprene rubber are particularly preferable among these rubbers.

From the viewpoint that both the first rubber phase and the second rubber phase are easily uniformly dispersed (finely dispersed) and the like, with respect to a total of 100 parts by mass of the isoprene rubber and the rubber other than the isoprene rubber, the blending amount of the compatibilizing agent is preferably in a range of 0.1 to 20 parts by mass, more preferably in a range of 0.5 to 15 parts by mass, and further preferably in a range of 1.0 to 10 parts by mass.

The conductive rubber composition constituting the elastic body layer 14 contains a crosslinking agent, a vulcanization accelerator, a vulcanization aid (crosslinking aid) and the like, if necessary. In addition, one, or two or more of additives such as a bulking agent, a reinforcing agent, a processing aid, an antioxidant, a plasticizer, an ultraviolet absorber, a lubricant, and the like can be contained. In addition, an ionic conductive agent may be contained in a range that does not affect the environment dependence of resistance. The ionic conductive agent may be a quaternary ammonium salt, a quaternary phosphonium salt, a borate salt, a surfactant, and the like.

The crosslinking agent may be a resin crosslinking agent, a sulfur crosslinking agent, a peroxide crosslinking agent, and a dechlorination crosslinking agent. These crosslinking agents may be used alone, or two or more of the crosslinking agents may be used in combination.

The resin crosslinking agent may be a phenol resin, a urea resin, an amino resin, a guanamine resin, a xylene resin, an unsaturated polyester resin, a diallyl phthalate resin, an epoxy resin, a urethane resin, and the like.

The sulfur crosslinking agent may be powdered sulfur, precipitated sulfur, colloidal sulfur, surface-treated sulfur, insoluble sulfur, sulfur chloride, a thiuram vulcanization accelerator, high polymer polysulfide, and the like.

The peroxide crosslinking agent may be peroxyketal, dialkyl peroxide, peroxyester, ketone peroxide, peroxy dicarbonate, diacyl peroxide, hydroperoxide, and the like.

The dechlorination crosslinking agent may be a dithiocarbonate compound. More specifically, the dechlorination crosslinking agent may be quinoxaline-2,3-dithiocarbonate, 6-methylquinoxaline-2,3-dithiocarbonate, 6-isopropylquinoxaline-2,3-dithiocarbonate, 5,8-dimethylquinoxaline-2,3-dithiocarbonate, and the like.

From the viewpoint of resistance to bleeding, the blending amount of the crosslinking agent is preferably in a range of 0.1 to 2 parts by mass, more preferably in a range of 0.3 to 1.8 parts by mass, and further preferably in a range of 0.5 to 1.5 parts by mass with respect to 100 parts by mass of uncrosslinked rubbers.

When the dechlorination crosslinking agent is used as the crosslinking agent, a dechlorination crosslinking accelerator may be used in combination. The dechlorination crosslinking accelerator may be 1,8-diazabicyclo(5,4,0)undecene-7 (hereinafter abbreviated as DBU) or a weak acid salt thereof. The dechlorination crosslinking accelerator may be used in the form of DBU, but is preferably used in the form of the weak acid salt of DBU from the viewpoint of handling the dechlorination crosslinking accelerator. The weak acid salt of DBU may be carbonate, stearate, 2-ethylhexylate, benzoate, salicylate, 3-hydroxy-2-naphthoate, phenol resin salt, 2-mercaptobenzothiazole salt, 2-mercaptobenzimidazole salt, and the like.

The resistance value of the elastic body layer 14 is in a range of $1.0 \times 10^3$ to $1.0 \times 10^6 \Omega$. The resistance value of the elastic body layer 14 can be adjusted by a selection of the type of the rubber other than the isoprene rubber, the blending ratio of the isoprene rubber and the rubber other than the isoprene rubber, the blending amount of the carbon black, and the like.

From the viewpoint of low resistance and the like, with respect to a total of 100 parts by mass of the isoprene rubber and the rubber other than the isoprene rubber, the content of the carbon black in the elastic body layer 14 is preferably 6 parts by mass or more, more preferably 7 parts by mass or more, and further preferably 8 parts by mass or more. In addition, from the viewpoint of low hardness, low settling and the like, with respect to a total of 100 parts by mass of the isoprene rubber and the rubber other than the isoprene rubber, the content of the carbon black is preferably 40 parts by mass or less, more preferably 35 parts by mass or less, and further preferably 30 parts by mass or less.

In the elastic body layer 14, it is preferable that the carbon black is eccentrically located in the second rubber phase containing the rubber other than the isoprene rubber than in the first rubber phase containing the isoprene rubber. The eccentric location in the second rubber phase means that the second rubber phase contains the carbon black at a higher density than in the first rubber phase. If the rubber other than the isoprene rubber is a polar rubber, the carbon black is easily eccentrically located in the second rubber phase. In addition, after the carbon black is mixed with the rubber other than the isoprene rubber, by mixing the rubber other than the isoprene rubber containing the carbon black with the isoprene rubber containing no carbon black, the carbon black is also easily eccentrically located in the second rubber phase. If the carbon black, which is an electronic conductive agent, is eccentrically located in the second rubber phase, the second rubber phase can function as a conductive phase, and the first rubber phase can function as a flexible phase. Thereby, the elastic body layer 14 can be made difficult to settle in low hardness.

The thickness of the elastic body layer 14 is not particularly limited, and may be appropriately set within a range of 0.1 to 10 mm depending on intended uses and the like.

The surface roughness Sa of the elastic body layer 14 is preferably 0.05 to 1.6 μm. If the surface roughness Sa of the elastic body layer 14 is within the above range, it is more excellent in an effect of suppressing the image adverse effect caused by the leak discharge. In addition, from this viewpoint, the surface roughness Sa of the elastic body layer 14 is more preferably 0.08 to 1.4 μm, and further preferably 0.1 to 1.2 μm. The surface roughness Sa is an arithmetic average roughness and is measured according to ISO 25178. The surface roughness Sa of the elastic body layer 14 can be adjusted by changing the composition ratio of the isoprene rubber and the rubber other than the isoprene rubber in the elastic body layer.

The surface layer 16 contains a crosslinked body of at least one polyurethane resin of an ether polyurethane resin and a carbonate polyurethane resin, and an electronic conductive agent. The ether polyurethane resin is a polyurethane resin containing polyether polyol as a polyol component. The carbonate polyurethane resin is a polyurethane resin containing polycarbonate polyol as a polyol component.

The ether polyurethane resin and the carbonate polyurethane resin have a relatively small amount of crystal components as compared with an ester polyurethane resin, and an acrylic resin such as a fluorine-containing acrylic resin and the like. In addition, one of the ether polyurethane resin and the carbonate polyurethane resin, which has a low glass transition point, has a relatively small amount of crystal components. In the surface layer 16, one of the ether polyurethane resin and the carbonate polyurethane resin, which has a relatively small amount of crystal components, is used as a binder resin. Because it is considered that a leak phenomenon originates from the crystal component of the binder resin contained in the surface layer 16 above the electronic conductive agent of the surface layer 16, by using the binder resin having a small amount of crystal components, the leak phenomenon which originates from the crystal component can be suppressed.

From the above viewpoint, the glass transition point after crosslinking the ether polyurethane resin and the carbonate polyurethane resin is preferably −10° C. or less, more preferably −20° C. or less, and further preferably −30° C. or less. On the other hand, from the viewpoint of adhesiveness and the like, the glass transition point after crosslinking the ether polyurethane resin and the carbonate polyurethane resin is preferably −70° C. or more, and more preferably −60° C. or more. The glass transition point after crosslinking the polyurethane resin can be measured in a manner of obtaining loss tangent tan δ by a dynamic viscoelasticity measurement in a tensile mode, and then using the temperature at the maximum peak as the glass transition temperature of the measured resin material.

Besides, from the viewpoint of suppressing the leak phenomenon originating from the crystal component, the glass transition point of the surface layer 16 is −10° C. or less. In addition, from the viewpoint of adhesiveness and the like, the glass transition point of the surface layer 16 is −70° C. or more. The glass transition point of the surface layer 16 is more preferably in a range of −20 to −60° C. The glass transition point of the surface layer can be measured in a manner of obtaining loss tangent tan δ by a dynamic viscoelasticity measurement in a tensile mode, and then using the temperature at the maximum peak as the glass transition temperature of the measured resin material.

The polyurethane resin of the surface layer 16 may be an aqueous polyurethane resin, or an oily polyurethane resin. If the polyurethane resin is an aqueous polyurethane resin, a water-based coating can be used as a material for forming the surface layer 16, and the environment can be considered.

The electronic conductive agent may be carbon black, graphite, potassium titanate, iron oxide, conductive titanium oxide, conductive zinc oxide, conductive tin oxide, and the like. From the viewpoint of conductivity and the like, carbon black and graphite are preferable among these electronic conductive agents.

The surface layer 16 can be formed by a composition containing at least one uncrosslinked polyurethane resin of the ether polyurethane resin and the carbonate polyurethane resin, a urethane curing agent, and an electronic conductive agent. When the polyurethane resin is an aqueous polyurethane resin, the surface layer 16 can be formed by an emulsion composition containing an aqueous polyurethane resin, a urethane curing agent, and an electronic conductive agent. The emulsion composition may contain an associative thickener.

The aqueous polyurethane resin is obtained by improving hydrophilicity with various methods and dispersing water. Depending on the method of water dispersion, the aqueous polyurethane resin includes forced-emulsification resins that use a surfactant as an emulsifier and self-emulsification resins in which a hydrophilic group is introduced into the polyurethane resin. Because the self-emulsification resins do not need to use a surfactant for emulsification, the deterioration of physical properties caused by the bleeding of the surfactant can be suppressed in the surface layer 16.

In the self-emulsification aqueous polyurethane resin, the hydrophilic group introduced into the polyurethane resin may be a nonionic hydrophilic group or an ionic hydrophilic group (an anionic hydrophilic group, a cationic hydrophilic group). Among these hydrophilic groups, the ionic hydrophilic group is preferable. The polyurethane resin having an ionic hydrophilic group has a high self-emulsification force, and is excellent in the dispersion stability of the aqueous polyurethane resin in the emulsion composition. Among the ionic hydrophilic groups, the anionic hydrophilic group is more preferable. Because the anionic hydrophilic group can form an amine salt and the hydrophilicity of a dry film is lowered due to the volatilization of amine during drying, the surface layer 16 is excellent in water resistance.

The anionic hydrophilic group may be a carboxylate group ($-COO^-$), a sulfonate group ($-SO_3^-$), and the like. The cationic hydrophilic group may be a quaternary ammonium group and the like. The nonionic hydrophilic group may be a polyoxyalkylene group and the like. Among the anionic hydrophilic groups, the carboxylate group is more preferable. Because the amine salt is easily formed and the hydrophilicity of the dry film is lowered due to the volatilization of amine during drying, the surface layer 16 is excellent in water resistance. Besides, if the anionic hydrophilic group is a carboxylate group and the carboxylate group forms an amine salt, the self-emulsification force is high and the dispersion stability of the aqueous polyurethane resin in the emulsion composition is excellent. In addition, because the hydrophilicity of the dry film is lowered due to the volatilization of amine during drying, the surface layer 16 is excellent in water resistance. That is, both dispersion stability and water resistance when a water-based coating is used can be highly compatible.

The polyurethane resin is a reaction product of polyisocyanate and polyol and has a soft segment composed of a polyol component having a weak cohesive force and a hard segment composed of a urethane bond having a strong cohesive force. The forced-emulsification aqueous polyurethane resin is composed of, for example, a polyisocyanate component and a polyol component. The self-emulsification aqueous polyurethane resin is composed of, for example, a polyisocyanate component, a polyol component, and a hydrophilic group-containing component.

The polyisocyanate used for forming the polyurethane resin may be diphenylmethane diisocyanate (MDI), polymethylene polyphenylene polyisocyanate (polymeric MDI), crude MDI (c-MDI) which is a mixture of MDI and polymeric MDI, dicyclohexylmethane diisocyanate (hydrogenated MDI), tolylene diisocyanate (TDI), hexamethylene diisocyanate (HDI), trimethyl hexamethylene diisocyanate (TMHDI), isophorone diisocyanate (IPDI), orthotoluidine diisocyanate (TODI), naphthylene diisocyanate (NDI), xylylene diisocyanate (XDI), p-phenylene diisocyanate (PDI), lysine diisocyanate methyl ester (LDI), dimethyl diisocyanate (DDI), MDI nurate, HDI nurate and TDI nurate which are multimers, modified products obtained by converting these polyisocyanate into urea, biuret, allophanate, carbodiimide, and urethane, and the like. These polyisocyanate may be used alone, or two or more types of the polyisocyanate may be used in combination as the polyisocyanate of the polyurethane resin. From the viewpoint of preventing coloration, the polyisocyanate of the polyurethane resin is preferably an aliphatic polyisocyanate (non-yellowing polyisocyanate).

The polyisocyanate used for forming the polyurethane resin may be a NCO-terminated urethane prepolymer obtained by reacting the polyisocyanate such as MDI described above with polyol. Because the urethane prepolymer used as the polyisocyanate has a NCO terminal, NCO % is preferably in a range of 5 to 30% by mass. NCO % is calculated by the following formula.

$$NCO\% = \frac{\dfrac{\text{weight of polyisocyanate}}{\text{equivalent weight of polyisocyanate}} - \dfrac{\text{weight of polyol}}{\text{equivalent weight of polyol}} \times 42.02}{\text{weight of polyisocyanate} + \text{equivalent weight of polyol}} \times 100$$

From the viewpoint of easy improvement of wear resistance, easy security of strength and resistance to settling, the blending amount of the polyisocyanate is preferably set in a manner that a NCO index (isocyanate index) is 110 or more.

The NCO index is more preferably 115 or more, and further preferably 120 or more, 125 or more, and 130 or more. On the other hand, from the viewpoint of not becoming too hard and easy to form, the blending amount of the polyisocyanate is preferably set in a manner that the NCO index is 250 or less. The NCO index is more preferably 200 or less, and further preferably 180 or less. The NCO index is calculated as an equivalent of an isocyanate group with respect to a total equivalent of 100 of active hydrogen groups (a hydroxyl group, an amino group, and the like) that react with the isocyanate group.

The polyol used for forming the polyurethane resin may be polyether polyol and polycarbonate polyol. From the viewpoint of wear resistance and the like, the polycarbonate polyol is preferable among these examples of the polyol.

The polyether polyol may be polypropylene glycol (PPG), polytetramethylene glycol (PTMG), ethylene oxide-modified polyol of the two, polyethylene glycol (PEG), and the like. The average molecular weight (Mn) of the polyether polyol is preferably in a range of 1000 to 10000.

The polycarbonate polyol (polycarbonate diol) can be obtained by using alkylene diol as a monomer and polymerizing the alkylene diol by a low molecular weight carbonate compound. The alkylene diol serving as a monomer may be 1,6-hexanediol, 1,5-pentanediol, 1,4-butanediol, cyclohexane dimethanol, and the like. The alkylene diol serving as a monomer may be only one, or two or more of these examples of the alkylene diol.

The hydrophilic group-containing component used for forming the aqueous polyurethane resin may be a dialkylol alkanoic acid, an amine salt of dialkylol alkanoic acid, a sulfonic acid sodium salt-containing diol, a polyalkylene polyol, and the like. The dialkylol alkanoic acid may be dimethylol propionic acid, dimethylol butanoic acid, dimethylol heptanic acid, dimethylol octanoic acid, and the like. The amine of the amine salt may be triethylamine and the like.

The urethane curing agent is a curing agent that cures the polyurethane resin. The urethane curing agent is composed of a compound containing an isocyanate group. The urethane curing agent is preferably a terminal isocyanate-modified polyurethane. The polyurethane of the terminal isocyanate-modified polyurethane is a reaction product of a polyisocyanate and a polyol. The polyisocyanate and the polyol used for forming the terminal isocyanate-modified polyurethane may be compounds exemplified in the polyisocyanate and the polyol used for forming the polyurethane resin.

The terminal isocyanate-modified polyurethane preferably has an anionic hydrophilic group. If the urethane curing agent is the terminal isocyanate-modified polyurethane and has the anionic hydrophilic group, the self-emulsification force is high, and the dispersion stability of the urethane curing agent in the emulsion composition is excellent. The anionic hydrophilic group may be those exemplified in the above aqueous polyurethane resin.

The terminal isocyanate-modified polyurethane is preferably a blocked isocyanate group in which a terminal isocyanate group is blocked with a blocking agent. In the blocked isocyanate, the blocking agent is dissociated and the isocyanate is liberated at a temperature equal to or higher than a predetermined dissociation temperature. The liberated isocyanate is the isocyanate that forms the blocked isocyanate. If the terminal isocyanate group is the blocked isocyanate group, the stability of the emulsion composition is excellent. In addition, in the emulsion composition, it is possible to slow down the curing of the aqueous polyurethane resin caused by the urethane curing agent. In this way, when the emulsion composition contains a fluorine surface modifier, the curing of the aqueous polyurethane resin caused by the urethane curing agent can be suppressed before the fluorine surface modifier bleeds on the surface after the application of the emulsion composition, and it is possible to contribute to sufficiently exhibiting properties of the fluorine surface modifier.

From the viewpoint that the blocking agent does not dissociate and the activity of the isocyanate group is easily maintained before the blocked isocyanate is heated to a predetermined temperature before or during application and the like, the dissociation temperature is preferably 100° C. or more, and more preferably 120° C. or more. In addition, from the viewpoint that the heating temperature for dissociating the blocking agent during the curing is easily suppressed to a low level and the like, the dissociation temperature is preferably 160° C. or less, and more preferably 140° C. or less.

A compound having active hydrogen is used as the blocking agent for forming the blocked isocyanate. The compound having active hydrogen may be an oxime compound, a pyrazole compound, a carbazole compound, secondary amine, a β-dicarbonyl compound, a lactam compound, a phenol compound, and the like. These compounds may be used alone, or two or more types of the compounds may be used in combination as the blocking agent for forming the blocked isocyanate.

Examples of oxime compound include aldoxime and ketoxime. The aldoxime may be formaldoxime, acetaldoxime, and the like. The ketoxime may be dimethyl ketoxime, methyl ethyl ketoxime, methyl isobutyl ketoxime, methyl amyl ketoxime, acetoxime, cyclohexanone oxime, and the like. The pyrazole compound may be pyrazole, 3-methyl pyrazole, 3,5-dimethyl pyrazole, and the like. The carbazole compound may be carbazole. The secondary amine may be dipropyl amine, diisopropyl amine, dibutyl amine, diisobutyl amine, di(tert-butyl) amine, ethyl propyl amine, ethyl isopropyl amine, ethyl butyl amine, ethyl isobutyl amine, ethyl(tert-butyl) amine, dicyclohexyl amine, N-methyl aniline, diphenyl amine, piperidine, 2-methyl piperidine, 2,6-dimethyl piperidine, 2,2,6,6-tetramethyl piperidine, and the like. The β-dicarbonyl compound may be malonic acid diester such as dimethyl malonate, diethyl malonate and the like, acetoacetic ester such as methyl acetoacetate, ethyl acetoacetate and the like, and the like. The lactam compound may be ε-caprolactam and the like. The phenol compound may be phenol and the like.

From the viewpoint of excellent stability of the blocked isocyanate and suitable dissociation temperature of the blocked isocyanate, the blocking agent is preferably methyl ethyl ketoxime, diisopropyl amine, phenol, ε-caprolactam, diethyl malonate, 3,5-dimethyl pyrazole, ethyl acetoacetate, and the like. In addition, from the viewpoint that the dissociation temperature of the blocked isocyanate tends to be relatively low, 3,5-dimethyl pyrazole and methyl ethyl ketoxime are preferable.

In the emulsion composition, with respect to 100 parts by mass of the aqueous polyurethane resin, the content of the urethane curing agent is preferably in a range of 5 to 40 parts by mass, more preferably in a range of 10 to 30 parts by mass, and further preferably in a range of 15 to 20 parts by mass.

The associative thickener is a thickener taking a hydrophilic group as a skeleton and having hydrophobic groups at side chains or terminals. In an aqueous medium, one hydrophobic group of the associative thickener adsorbs to a hydrophobic group of the other associative thickener or added particles, and the other hydrophobic group of the associative thickener adsorbs to the other hydrophobic group of the other associative thickener or the other added particles, and thereby a crosslinked structure is formed and a thickening effect can be obtained. Thus, the associative thickener forms a crosslinked structure that crosslinks between the electronic conductive agents.

In the associative thickener, the hydrophilic group may be a nonionic hydrophilic group or an ionic hydrophilic group (an anionic hydrophilic group, a cationic hydrophilic group). The associative thickener is preferably a nonionic thickener having a hydrophobic group and a nonionic hydrophilic group. If the associative thickener is a nonionic thickener having a hydrophobic group and a nonionic hydrophilic group, because the electrostatic action of the associative thickener is small, the decrease in dispersibility of the urethane curing agent in the emulsion composition caused by the electrostatic action of the associative thickener can be suppressed. In addition, when the aqueous polyurethane resin or the urethane curing agent has an anionic hydrophilic group, the gelation caused by an ionic interaction between the aqueous polyurethane resin and the associative thickener, or an ionic interaction between the urethane curing agent and the associative thickener can be suppressed.

The hydrophilic group of the associative thickener may be the hydrophilic group exemplified in the aqueous polyurethane resin. The hydrophilic group of the associative thickener is particularly preferably a nonionic polyoxyalkylene group. The hydrophobic group of the associative thickener may be an alkyl group and a phenyl group. Among these hydrophobic groups, the alkyl group is preferable. The alkyl group may be linear, branched or cyclic. The number of carbon atoms of the alkyl group is preferably in a range of 4 to 30. From the viewpoint of dispersibility in water and the like, an alkyl group having a branched chain is particularly preferable among the alkyl groups.

The associative thickener is preferably a urethane associative thickener. That is, the associative thickener is preferably an associative thickener having a polyurethane as a skeleton. The polyol or polyisocyanate for forming the polyurethane of the skeleton may be those exemplified in the aqueous polyurethane resin. Depending on the type of the polyol, the urethane associative thickener can be ester-based, ether-based, carbonate-based, or the like. In an ether associative thickener in which the polyol is polyether polyol, the polyether part of the polyether polyol is a hydrophilic group. The urethane associative thickener is particularly preferably an ether associative thickener. In addition, from the viewpoint of preventing coloration, the polyisocyanate of the urethane associative thickener is preferably an aliphatic polyisocyanate (non-yellowing polyisocyanate).

In the emulsion composition, with respect to 100 parts by mass of the aqueous polyurethane resin, the content of the associative thickener is preferably in a range of 0.5 to 10 parts by mass, more preferably in a range of 1.0 to 8.0 parts by mass, and further preferably in a range of 1.5 to 5.0 parts by mass.

The electronic conductive agent is blended for the conductivity of the surface layer 16. The electronic conductive agent preferably has an anionic surface functional group. This surface functional group may be a carboxylate group ($-COO^-$), a hydroxyl group ($-OH$), and the like. If the electronic conductive agent has an anionic surface functional group, the dispersion stability of the electronic conductive agent in the emulsion composition is excellent.

In the emulsion composition, with respect to 100 parts by mass of the aqueous polyurethane resin, the content of the electronic conductive agent is preferably in a range of 5.0 to 50 parts by mass, and more preferably in a range of 10 to 25 parts by mass.

The emulsion composition may contain a surface modifier in a range that does not affect the present disclosure. The surface modifier may be a fluorine surface modifier or a silicone surface modifier. In addition, the emulsion composition may contain particles for roughness formation for forming the surface roughness. In addition, the emulsion composition may contain an additive. The additive may be a filler, a stabilizer, an ultraviolet absorber, a lubricant, a mold release agent, a dye, a pigment, a flame retardant, and the like.

The particles for roughness formation form surface irregularities on the surface layer 16. The particles for roughness formation may be resin particles, silica particles, and the like. The resin particles may be urethane particles, silicone particles, acrylic particles, and the like. The average particle diameter of the particle for roughness formation is preferably in a range of 3 to 50 μm. The average particle diameter of the particle for roughness formation can be calculated from the median diameter by using a laser diffraction particle size distribution measuring device.

In a case where the surface layer 16 contains the particles for roughness formation, when viewed in the thickness direction, it is preferable that the line roughness Rz at a portion of the surface layer 16 containing the particles for roughness formation is 5.0 to 15.0 μm, and the product Sz·Sm of the surface roughness Sz and the line roughness Sm at a portion of the surface layer 16 containing no particle for roughness formation is 7.5 to 250.0 μm. If the line roughness Rz of the surface layer 16, and the product Sz·Sm of the surface roughness Sz and the line roughness Sm of the surface layer 16 are within the above ranges, it is more excellent in an effect of suppressing the image adverse effect caused by the leak discharge. In addition, from this viewpoint, the line roughness Rz of the surface layer 16 is more preferably 5.5 to 14.5 μm, and the product Sz·Sm of the surface layer 16 is more preferably 10 to 80 μm. The surface roughness Sz of the surface layer 16 is a roughness evaluation method for showing the surface texture, and is measured according to ISO 25178. The line roughness Rz of the surface layer 16 is measured according to JIS B0601. The line roughness Sm of the surface layer 16 is an average interval (μm) of convex parts based on the particles for roughness formation, and is measured according to JIS B0601. The product Sz·Sm of the surface roughness Sz and the line roughness Sm of the surface layer 16 can be adjusted by the magnitude of the average particle diameter and the blending amount of the particles for roughness formation.

In the surface layer 16, the content of the particles for roughness formation in terms of the entire surface layer 16 (assuming 100% by mass) is preferably in a range of 5 to 50% by mass, and more preferably in a range of 10 to 35% by mass.

The fluorine surface modifier is composed of a compound having a fluorine-containing organic group (a compound having a fluorine-containing group). By appearing on the surface of the surface layer 16, the fluorine surface modifier suppresses the adhesion of toner, an external toner agent and the like, and improves the antifouling property of the roll surface. Preferably, the fluorine surface modifier further has a carboxy group and an amino group. If the fluorine surface modifier has a carboxy group and an amino group, the resistance uniformity is improved.

The fluorine surface modifier can be configured as an acrylic polymer. The acrylic polymer means a copolymer of (meth)acrylate, a copolymer of (meth)acrylamide, a copolymer of (meth)acrylate and (meth)acrylamide, and the like. For example, a surface modifier having a fluorine-containing organic group can be obtained by copolymerizing (meth)acrylate having a fluorine-containing organic group and (meth)acrylate having a fluorine-free organic group. In addition, a surface modifier having a fluorine-containing organic group, a carboxy group and an amino group can be obtained by copolymerizing (meth)acrylate having a fluorine-containing organic group, (meth)acrylate having a fluorine-free organic group, (meth)acrylate having a carboxy group, and (meth)acrylate having an amino group.

The acrylic polymer may contain non-modified (meth)acrylate or non-modified (meth)acrylamide that is copolymerizable, as a copolymerization component. The non-modified (meth)acrylate may be alkyl (meth)acrylate, hydroxyalkyl (meth)acrylate, and the like. The alkyl (meth)acrylate may be methyl (meth)acrylate, ethyl (meth)acrylate, propyl (meth)acrylate, butyl (meth)acrylate, 2-ethylhexyl (meth)acrylate, and the like. The hydroxyalkyl (meth)acrylate may be hydroxyethyl (meth)acrylate, hydroxypropyl (meth)acrylate, hydroxybutyl (meth)acrylate, and the like. From the viewpoint of copolymerization reactivity and the like, methyl (meth)acrylate is preferable among these examples of alkyl (meth)acrylate.

The copolymerizable non-modified (meth)acrylamide may be (meth)acrylamide, alkyl (meth)acrylamide, hydroxyalkyl (meth)acrylamide, and the like. The alkyl (meth)acrylamide may be methyl (meth)acrylamide, ethyl (meth)acrylamide, propyl (meth)acrylamide, butyl (meth)acrylamide, 2-ethylhexyl (meth)acrylamide, and the like. The hydroxyalkyl (meth)acrylamide may be hydroxyethyl (meth)acrylamide, hydroxypropyl (meth)acrylamide, hydroxybutyl (meth)acrylamide, and the like. From the viewpoint of copolymerization reactivity and the like, methyl (meth)acrylamide is preferable among these examples of alkyl (meth)acrylamide.

The fluorine-containing organic group may be a fluoroalkyl group having 1 to 20 carbon atoms. The fluoroalkyl group may be a perfluoroalkyl group in which all hydrogen atoms of the alkyl group are substituted with fluorine atoms, or a fluoroalkyl group in which some hydrogen atoms of the alkyl group are substituted with fluorine atoms. From the viewpoint of being easily eccentrically located on the surface of the surface layer 16 and the like, the perfluoroalkyl group is preferable among these examples of the fluoroalkyl group.

The fluoroalkyl group having 1 to 20 carbon atoms may be a trifluoromethyl group, a pentafluoroethyl group, a heptafluoropropyl group, a nonafluorobutyl group, a trifluoroethyl group, a pentafluoropropyl group, a heptafluorobutyl group, and the like.

The (meth)acrylate having a fluorine-containing group and the (meth)acrylamide having a fluorine-containing group can be represented by, for example, the following general formula (1).

[Chemical formula 1]

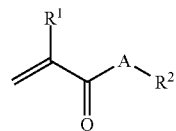

(1)

In formula (1), A is O or NH, $R^1$ is hydrogen or a methyl group, and $R^2$ is a fluoroalkyl group having 1 to 20 carbon atoms.

The (meth)acrylate having a carboxy group may be (meth)acrylic acid, and the like. The (meth)acrylate having an amino group may be dialkylamino alkyl (meth)acrylate, and the like. The (meth)acrylamide having an amino group may be dialkylamino alkyl (meth)acrylamide.

In the fluorine surface modifier, from the viewpoint that the fluorine surface modifier is easily eccentrically located on the surface of the surface layer 16 and the like, the content of the fluorine-containing group is preferably in a range of 0.01 to 60 mol %, more preferably in a range of 0.05 to 50 mol %, and further preferably in a range of 0.1 to 30 mol %. In addition, in the fluorine surface modifier having a carboxy group and an amino group, the content of the carboxy group and the amino group is preferably in a range of 0.01 to 60 mol %, more preferably in a range of 0.05 to 50 mol %, and further preferably in a range of 0.1 to 30 mol %. Each content can be measured by GC-MS analysis, NMR analysis, or the like.

The emulsion composition is a water-based coating. The water-based coating has a slower drying rate than an organic coating. Therefore, a convection occurs in liquid during the formation of the surface layer 16, the frequency of collision between the electronic conductive agents increases, and aggregation tends to occur. If the electronic conductive agent aggregates in the surface layer 16, the resistance uniformity of the surface layer 16 deteriorates. The convection of the electronic conductive agent in the liquid can be suppressed by, for example, the blending of a thickener. On the other hand, it is necessary to prevent the thickener to be blended from affecting the dispersion mechanism of the electronic conductive agent in the water-based coating. In the emulsion composition, because the thickener to be blended is an associative thickener, the thickener to be blended does not affect the dispersion mechanism of the electronic conductive agent, exerts a thickening effect to suppress the aggregation of the electronic conductive agent during the formation of the surface layer 16, and thereby the resistance uniformity of the surface layer 16 is excellent. If the thickener to be blended is a non-associative thickener, due to the interaction of the electronic conductive agents, the dispersion mechanism of the electronic conductive agent in the water-based coating is affected, and the aggregation of the electronic conductive agent cannot be sufficiently suppressed.

In addition, when the fluorine surface modifier is blended, in order to sufficiently exert the function of the fluorine surface modifier, it is necessary to bleed the fluorine surface modifier on the surface in a coating film of the emulsion composition. Therefore, in order to slow down the curing of the aqueous polyurethane resin caused by the urethane curing agent, in the urethane curing agent, a blocked isocyanate group in which the terminal isocyanate group is blocked with a blocking agent is preferable. In this case, a curing reaction is slowed down and thus the electronic conductive agent tends to aggregate. However, by using the associative thickener, the aggregation of the electronic conductive agent can be suppressed even in this case and the resistance can be satisfied.

The thickness of the surface layer 16 is not particularly limited, and is preferably in a range of 0.1 to 50 μm, more preferably in a range of 0.1 to 30 μm, and further preferably in a range of 0.3 to 20 μm. The thickness of the surface layer 16 can be measured by observing the cross section using a laser microscope (for example, "VK-9510" manufactured by KEYENCE, or the like).

The surface layer 16 can be adjusted to have a predetermined volume resistivity. The volume resistivity of the surface layer 16 may be appropriately set in a range of $10^7$ to $10^{14}$ Ω·cm, $10^8$ to $10^{13}$ Ω·cm, $10^9$ to $10^{12}$ Ω·cm, or the like. The volume resistivity can be measured according to JIS K6911.

The conductive roll 10 can be manufactured, for example, as follows. First, the shaft body 12 is coaxially arranged in a hollow part of a roll molding die, an uncrosslinked conductive rubber composition is injected, heated and cured (crosslinked), and thereafter demolded, or the uncrosslinked conductive rubber composition is extrusion-molded on the surface of the shaft body 12, and thereby the elastic body layer 14 is formed on the outer periphery of the shaft body 12. Next, the material for forming the surface layer 16 can be applied to the outer peripheral surface of the elastic body layer 14 and, if necessary, subjected to a heat treatment, a crosslinking treatment or the like to form the surface layer 16.

The shaft body 12 is not particularly limited as long as it has conductivity. Specifically, core metal formed of a solid body or a hollow body which is made of a metal such as iron, stainless steel, aluminum or the like can be exemplified. If necessary, an adhesive, a primer, or the like may be applied to the surface of the shaft body 12. That is, the elastic body layer 14 may be adhered to the shaft body 12 via an adhesive layer (primer layer). The adhesive, the primer and the like may be made conductive as necessary.

According to the conductive roll 10 having the above configuration, the elastic body layer 14 has low resistance and excellent resistance uniformity, the glass transition point of the surface layer 16 is low, the crystal component of the polyurethane resin that is a binder is small, and thus the image adverse effect caused by the leak discharge can be suppressed. In addition, because the carbon black is used as the conductive agent of the elastic body layer 14, the environment dependence of resistance can also be suppressed.

EXAMPLES

Hereinafter, the present disclosure is described in detail with reference to examples and comparison examples.

<Preparation of Conductive Rubber Composition>

Each component was blended according to the blending composition (part by mass) shown in table 1, and the obtained mixture was stirred and mixed with a stirrer to prepare a conductive rubber composition for forming an elastic body layer. Materials used are as follows.

Isoprene rubber (IR): "JSR IR2200" manufactured by JSR
Nitrile rubber (NBR): "N237H" manufactured by JSR
Butadiene rubber (BR): "BR01" manufactured by JSR
Hydrin rubber (ECO): "Hydrin T3106" manufactured by Zeon Corporation
Carbon black (CB): "Denka black" manufactured by Denka Company Limited
Crosslinking agent (peroxide): "Percumyl D40" manufactured by NOF Corporation <Production of Elastic Body Layer>

Core metal (diameter 6 mm) was set on the central axis of a molding die having a cylindrical molding cavity of φ9 mm, the conductive rubber composition was injected into the molding cavity, heated and crosslinked at 160° C. for 30 minutes, then cooled and demolded, and an elastic body layer having a thickness of 1.5 mm was formed on the outer periphery of the core metal.

<Preparation of Surface Layer Composition>

Examples 1 to 13, Examples 15 to 16, Comparison Examples 1 to 9

The blending shown in table 1 was diluted with water so that the solid content concentration was 15% by mass to prepare an emulsion composition. Materials used are as follows.

Aqueous ether polyurethane: solid content of "Evafanol HA-15" manufactured by Nicca Chemical Co., Ltd.

Aqueous carbonate polyurethane: solid content of "Evafanol HA-107C" manufactured by Nicca Chemical Co., Ltd.

Aqueous ester polyurethane: solid content of "X-7096" manufactured by Nicca Chemical Co., Ltd.

Aqueous fluororesin: solid content of "Lumiflon FD 1000" manufactured by AGC

Carbon black (CB): "Aqua Black 162" manufactured by Tokai Carbon Co., Ltd.

Crosslinking agent (isocyanate): "Trixiene Aqua BI 200" manufactured by Baxenden Associative thickener: "Adekanol UH-756VF" manufactured by ADEKA Particles for roughness formation: "Tuftic AR750SSQ" (acrylic particle) manufactured by Japan Exlan Company, Limited Example 14

The blending shown in table 1 was diluted with MEK so that the solid content concentration was 15% by mass and dispersed by a bead mill to prepare a coating composition. Materials used are as follows.

Non-aqueous ether polyurethane: "Miractran E380" manufactured by Nippon Miractran Company Limited Carbon black(CB): "Denka black" manufactured by Denka Company Limited Particles for roughness formation: "Tuftic AR750SSQ" (acrylic particle) manufactured by Japan Exlan Company, Limited <Production of Surface Layer>

The prepared surface layer composition (the emulsion composition or the coating composition) was applied to the outer periphery of the elastic body layer, air-dried for 30 minutes, and then subjected to a heat treatment at 150° C. for 30 minutes in a PH oven. In this way, a surface layer was formed. In this way, a conductive roll was produced.

As for the elastic body layer of the produced conductive roll, the area ratio of a phase containing IR was measured. In addition, the resistance value of the elastic body layer of the produced conductive roll was measured. In addition, the surface roughness Sa of the elastic body layer of the produced conductive roll was measured. In addition, the glass transition point of the surface layer of the produced conductive roll was measured. In addition, the line roughness Rz at a portion of the surface layer of the produced conductive roll containing particles for roughness formation was measured, the surface roughness Sz and the line roughness Sm at a portion containing no particle for roughness formation were measured, and the product Sz·Sm was obtained. Then, evaluations of leak, environment dependence, adhesion and image were performed for the produced conductive roll.

(Area Ratio)

An arbitrary cross section of the elastic body layer was observed, an arbitrary range of 40 μm×40 μm in the cross section was divided into 64 parts, 16 masses that intersect and line up diagonally were selected, the area ratios of the first rubber phase (the phase containing IR) and the second rubber phase in each 5 μm×5 μm square were measured respectively, and the area ratio is a value corresponding to 14 masses or more (85% or more) of the selected 16 masses.

(Measurement of Resistance Value)

The elastic body layer of the conductive roll before a surface layer is formed was brought into line-contact with a metal rod, in a NN environment (23° C., 50% RH), the metal rod was rotationally driven with a load of 300 g applied to each of both ends of the shaft body of the conductive roll, the conductive roll was rotated around at 30 rpm, with a DC voltage of 200 V applied from the ends of the shaft body of the conductive roll, the electrical resistance between the shaft body and the metal rod was measured (1 minute), and thereby the resistance value (Ω) of the elastic body layer of the conductive roll was obtained.

(Surface Roughness Sa)

According to ISO 25178, measurement was performed, using a laser microscope ("VKX-100" manufactured by KEYENCE), at three arbitrary points on the inner periphery of each of three positions, that is, axial inner positions which are respectively separated by 5 mm from both ends of the outer peripheral surface of the surface layer of the conductive roll and an axial center position, and the average value of surface roughness at the total nine points (three points× three positions) was used as the surface roughness Sa.

(Line Roughness Rz)

According to JIS B0601, measurement was performed, using a surface roughness meter ("Surfcom 1400D" manufactured by Tokyo Seimitsu Co., Ltd.), at three arbitrary points on the inner periphery of each of three positions, that is, axial inner positions which are respectively separated by 5 mm from both ends of the outer peripheral surface of the surface layer of the conductive roll and an axial center position, and the average value of line roughness at the total nine points (three points×three positions) was used as the line roughness Rz.

(Surface Roughness Sz)

According to ISO 25178, measurement was performed, using a laser microscope ("VKX-100" manufactured by KEYENCE), at three arbitrary points on the inner periphery of each of three positions, that is, axial inner positions which are respectively separated by 5 mm from both ends of the outer peripheral surface of the surface layer of the conductive roll and an axial center position, and the average value of surface roughness at the total nine points (three points× three positions) was used as the surface roughness Sz.

(Line Roughness Sm)

According to JIS B0601, measurement was performed, using a surface roughness meter ("Surfcom 1400D" manufactured by Tokyo Seimitsu Co., Ltd.), at three arbitrary points on the inner periphery of each of three positions, that is, axial inner positions which are respectively separated by 5 mm from both ends of the outer peripheral surface of the surface layer of the conductive roll and an axial center position, and the average value of line roughness at the total nine points (three points×three positions) was used as the line roughness Sm.

(Measurement of Glass Transition Point)

The prepared surface layer composition (the emulsion composition or the coating composition) was applied onto a PET film, air-dried for 30 minutes, and then heat-treated at 150° C. for 30 minutes in a PH oven. After that, a surface layer sample of 3.5×20 mm was cut out, the loss tangent tan δ was obtained by a dynamic viscoelasticity measuring machine, and the temperature at the maximum peak was used as the glass transition point.

(Leak)

The produced conductive roll was incorporated into "CLJ4525dn" manufactured by HP Corporation, a halftone image is output in a low temperature and low humidity environment (LL environment) of 15° C.×10% RH (relative humidity), the occurrence state of an image adverse effect caused by an abnormal discharge in the axial direction of a charging roll (conductive roll) and a pinhole leak was evaluated from the above image. When there is no image unevenness caused by an abnormal discharge of the charging roll (conductive roll) in the axial direction and a pinhole leak, or the occurrence of image unevenness is extremely small and there is no problem in practical use, it is regarded as "○"; when the image unevenness occurs in a part of the image or the entire image and an image adverse effect is generated, it is regarded as "X".

(Environment Dependence)

The resistance value of the elastic body layer was measured respectively under low temperature and low humidity conditions (15° C.×10% RH) and high temperature and high humidity conditions (32.5° C.×85% RH) in the same manner as above (the measurement of resistance value). The measured resistance value was converted into LOG, and the difference in resistance value under low temperature and low humidity conditions and high temperature and high humidity conditions was shown by the number of variable digits. At this time, when the number of variable digits is 1.2 digits or less, the environment dependence is small and it is regarded as "0". When the number of variable digits exceeds 1.2, the environment dependence is large and it is regarded as "x".

(Adhesion)

A quadrilateral cut part of a 1 cm square was formed on the surface of the surface layer of each conductive roll by using a cutter knife. Next, an adhesive tape ("610S #50" manufactured by Teraoka Seisakusho Co., Ltd.) was attached to the cut part, and then the adhesive tape was peeled off with a force of 0.45 kgf. When the cut part was not peeled off at all, or when the peeling was seen at a corner part of the cut part but the other parts thereof were not peeled off, the adhesion is extremely excellent and it is regarded as "○". When the cut part was completely peeled off, the adhesion is poor and it is regarded as "x".

(Image)

The produced conductive roll was incorporated into "CLJ4525dn" manufactured by HP Corporation, and imaged in an environment of 15° C.×10% RH. When a white spot image was generated due to an abnormal discharge, it is regarded as defective "x". When there was no white spot image, and no image roughness caused by discharge variation (improvement in image quality due to uniform discharge), it is regarded as good "○".

TABLE 1

| | | Example | | | | | | |
|---|---|---|---|---|---|---|---|---|
| | | 1 | 2 | 3 | 4 | 5 | 6 | 7 |
| Elastic body layer | IR | 80 | 80 | 70 | 60 | 60 | 50 | 60 |
| | NBR | 20 | 20 | 30 | 40 | 40 | 50 | — |
| | BR | — | — | — | — | — | — | 40 |
| | ECO | — | — | — | — | — | — | — |
| | CB | 30 | 15 | 28 | 26 | 24 | 24 | 35 |
| | Crosslinking agent (peroxide) | 3 | 3 | 3 | 3 | 3 | 3 | 3 |
| | Resistance value (Ω) | $1.0 \times 10^3$ | $1.0 \times 10^6$ | $1.0 \times 10^3$ | $1.0 \times 10^3$ | $1.0 \times 10^4$ | $1.0 \times 10^3$ | $1.0 \times 10^4$ |
| | Area ratio of first rubber phase (%) | 80 | 80 | 70 | 60 | 60 | 50 | 60 |
| | Sa (μm) | 0.09 | 0.08 | 0.4 | 0.8 | 0.9 | 1.0 | 1.0 |
| Surface layer | Aqueous ether polyurethane | 100 | 100 | 100 | 100 | 100 | 100 | 100 |
| | Non-aqueous ether polyurethane | — | — | — | — | — | — | — |
| | Aqueous carbonate polyurethane | — | — | — | — | — | — | — |
| | Aqueous ester polyurethane | — | — | — | — | — | — | — |
| | Aqueous fluororesin | — | — | — | — | — | — | — |
| | CB | 30 | 30 | 30 | 30 | 30 | 30 | 30 |
| | Associative thickener | 2 | 2 | 2 | 2 | 2 | 2 | 2 |
| | Crosslinking agent (isocyanate) | 15 | 15 | 15 | 15 | 15 | 15 | 15 |
| | Particles for roughness formation | 25 | 25 | 25 | 25 | 25 | 25 | 25 |
| | Tg (° C.) | −40 | −40 | −40 | −40 | −40 | −40 | −40 |
| | Rz (μm) | 11.0 | 10.6 | 10.0 | 11.4 | 11.5 | 11.9 | 12.6 |
| | Sz · Sm | 55.0 | 60.5 | 57.0 | 58.1 | 55.0 | 52.2 | 59.8 |
| Evaluation | Leak | ○ | ○ | ○ | ○ | ○ | ○ | ○ |
| | Environment dependence | ○ | ○ | ○ | ○ | ○ | ○ | ○ |
| | Adhesion | ○ | ○ | ○ | ○ | ○ | ○ | ○ |
| | Image | ○ | ○ | ○ | ○ | ○ | ○ | ○ |

TABLE 2

| | | Example | | | | | | | | |
|---|---|---|---|---|---|---|---|---|---|---|
| | | 8 | 9 | 10 | 11 | 12 | 13 | 14 | 15 | 16 |
| Elastic body layer | IR | 80 | 80 | 80 | 90 | 10 | 80 | 80 | 80 | 80 |
| | NBR | — | 20 | 10 | 90 | 20 | 20 | 20 | 20 | 20 |
| | BR | — | — | — | — | — | — | — | — | — |
| | ECO | 20 | — | — | — | — | — | — | — | — |
| | CB | 30 | 30 | 30 | 35 | 25 | 30 | 30 | 30 | 30 |

TABLE 2-continued

|  |  | Example | | | | | | | | |
|---|---|---|---|---|---|---|---|---|---|---|
|  |  | 8 | 9 | 10 | 11 | 12 | 13 | 14 | 15 | 16 |
|  | Crosslinking agent (peroxide) | 3 | 3 | 3 | 3 | 3 | 3 | 3 | 3 | 3 |
|  | Resistance value ($\Omega$) | $1.0 \times 10^3$ | $1.0 \times 10^3$ | $1.0 \times 10^3$ | $1.0 \times 10^3$ | $1.0 \times 10^3$ | $1.0 \times 10^3$ | $1.0 \times 10^3$ | $1.0 \times 10^3$ | $1.0 \times 10^3$ |
|  | Area ratio of first rubber phase (%) | 80 | 80 | 80 | 90 | 10 | 80 | 80 | 80 | 80 |
|  | Sa ($\mu$m) | 0.1 | 0.09 | 0.08 | 0.05 | 1.6 | 1.0 | 0.09 | 0.1 | 0.1 |
| Surface layer | Aqueous ether polyurethane | 100 | — | 100 | 100 | 100 | 100 | — | 100 | 100 |
|  | Non-aqueous ether polyurethane | — | — | — | — | — | — | 100 | — | — |
|  | Aqueous carbonate polyurethane | — | 100 | — | — | — | — | — | — | — |
|  | Aqueous ester polyurethane | — | — | — | — | — | — | — | — | — |
|  | Aqueous fluororesin | — | — | — | — | — | — | — | — | — |
|  | CB | 30 | 30 | 30 | 30 | 30 | 30 | 30 | 30 | 30 |
|  | Associative thickener | 2 | 2 | 2 | 2 | 2 | — | 2 | 2 | 2 |
|  | Crosslinking agent (isocyanate) | 15 | 15 | 15 | 15 | 15 | 15 | — | 15 | 15 |
|  | Particles for roughness formation | 25 | 25 | 25 | 25 | 25 | 25 | 25 | 10 | 35 |
|  | Tg (°C.) | −40 | −30 | −40 | −40 | −40 | −40 | −60 | −40 | −40 |
|  | Rz ($\mu$m) | 9.6 | 10.0 | 10.2 | 10.8 | 11.2 | 13.4 | 12.2 | 5.0 | 15.0 |
|  | Sz · Sm | 53.4 | 58.0 | 51.6 | 70.4 | 55.5 | 72.0 | 51.0 | 7.5 | 250.0 |
| Evaluation | Leak | ○ | ○ | ○ | ○ | ○ | ○ | ○ | ○ | ○ |
|  | Environment dependence | ○ | ○ | ○ | ○ | ○ | ○ | ○ | ○ | ○ |
|  | Adhesion | ○ | ○ | ○ | ○ | ○ | ○ | ○ | ○ | ○ |
|  | Image | ○ | ○ | ○ | ○ | ○ | ○ | ○ | ○ | ○ |

TABLE 3

|  |  | Comparison example | | | | | | | | |
|---|---|---|---|---|---|---|---|---|---|---|
|  |  | 1 | 2 | 3 | 4 | 5 | 6 | 7 | 8 | 9 |
| Elastic body layer | IR | 60 | 80 | — | — | 100 | 100 | 80 | 10 | 80 |
|  | NBR | 40 | 20 | — | — | — | — | 20 | 90 | 20 |
|  | BR | — | — | — | — | — | — | — | — | — |
|  | ECO | — | — | 100 | 100 | — | — | — | — | — |
|  | CB | 35 | 40 | 30 | 30 | 30 | 30 | 30 | 30 | 30 |
|  | Crosslinking agent (peroxide) | 3 | 3 | 3 | 3 | 3 | 3 | 3 | 3 | 3 |
|  | Resistance value ($\Omega$) | $6.67 \times 10^2$ | $6.67 \times 10^2$ | $1.0 \times 10^3$ | $1.0 \times 10^3$ | $1.0 \times 10^3$ | $1.0 \times 10^3$ | $1.0 \times 10^3$ | $1.0 \times 10^3$ | $1.0 \times 10^3$ |
|  | Area ratio of first rubber phase (%) | 60 | 80 | 0 | 0 | 100 | 100 | 80 | 10 | 80 |
|  | Sa ($\mu$m) | 0.8 | 0.1 | 0.02 | 0.02 | 0.03 | 0.03 | 0.09 | 1.6 | 0.09 |
| Surface layer | Aqueous ether polyurethane | 100 | 100 | — | 100 | — | 100 | — | — | — |
|  | Non-aqueous ether polyurethane | — | — | — | — | — | — | — | — | — |
|  | Aqueous carbonate polyurethane | — | — | — | — | — | — | — | — | — |
|  | Aqueous ester polyurethane | — | — | — | — | — | — | — | — | 100 |
|  | Aqueous fluororesin | — | — | 100 | — | 100 | — | 100 | 100 | — |
|  | CB | 30 | 30 | 30 | 30 | 30 | 30 | 30 | 30 | 30 |
|  | Associative thickener | 2 | 2 | 2 | 2 | 2 | 2 | 2 | 2 | 2 |
|  | Crosslinking agent (isocyanate) | 15 | 15 | 15 | 15 | 15 | 15 | 15 | 15 | 15 |
|  | Particles for roughness formation | 25 | 25 | 25 | 25 | 25 | 25 | 25 | 25 | 25 |
|  | Tg (°C.) | −40 | −40 | −50 | −40 | 50 | −40 | 50 | 50 | 25 |
|  | Rz ($\mu$m) | 12.1 | 11.0 | 11.9 | 10.7 | 10.4 | 11.6 | 9.9 | 10.5 | 11.0 |
|  | Sz · Sm | 59.7 | 50.4 | 60.4 | 54.3 | 49.1 | 59.3 | 64.7 | 61.0 | 59.0 |
| Evaluation | Leak | x | x | ○ | ○ | x | x | x | x | x |
|  | Environment dependence | ○ | ○ | x | x | ○ | ○ | ○ | ○ | ○ |
|  | Adhesion | ○ | ○ | x | x | ○ | ○ | ○ | ○ | ○ |
|  | Image | ○ | ○ | ○ | ○ | ○ | ○ | ○ | ○ | ○ |

In Comparison examples 1 and 2, the resistance value of the elastic body layer is low, and the leak phenomenon cannot be suppressed. In Comparison examples 3 and 4, the rubber of the elastic body layer is only the hydrin rubber, the base rubber of the elastic body layer is easily affected by environmental fluctuations, and the environment dependence of the resistance is high. In Comparison examples 5 and 6, the rubber of the elastic body layer is only the isoprene rubber, if the amount of carbon black of the elastic body layer is small, electric charges tend to accumulate and a leak occurs, and if the amount of carbon black of the elastic body layer is increased for resistance, the leak is caused. Therefore, the leak phenomenon cannot be suppressed. In Comparison examples 3, 5, 7 and 8, because the surface layer is composed of a fluororesin having a large amount of crystal components instead of a specific polyurethane resin, the leak phenomenon cannot be suppressed. In Comparison example 9, because the surface layer is composed of an ester polyurethane resin having a large amount of crystal components instead of a specific polyurethane resin, the leak phenomenon cannot be suppressed.

In contrast, according to the examples, the elastic body layer is composed of the conductive rubber composition containing an isoprene rubber, a rubber other than the isoprene rubber, and carbon black; the elastic body layer is phase-separated into the first rubber phase containing the isoprene rubber and the second rubber phase containing the rubber other than the isoprene rubber; in the range of a 5 μm×5 μm square of an arbitrary cross section of the elastic body layer, the area ratio of the first rubber phase with respect to a total of the first rubber phase and the second rubber phase is within a range of 10 to 90%; the resistance value of the elastic body layer is within a range of $1.0\times10^3$ to $1.0\times10^6\Omega$; and the surface layer contains an electronic conductive agent and a crosslinked body of at least one polyurethane resin of the ether polyurethane resin and the carbonate polyurethane resin, and the glass transition point of the surface layer is within a range of −10 to −70° C. The image adverse effect caused by the leak discharge can be suppressed and the environment dependence of resistance is also excellent.

Although the embodiments and examples of the present disclosure have been described above, the present disclosure is not limited to the above embodiments and examples, and various modifications can be made without departing from spirits of the present disclosure.

What is claimed is:

1. A charging roll for an electrophotographic device, comprising:
 a shaft body, an elastic body layer formed on the outer periphery of the shaft body, and a surface layer formed on the outer periphery of the elastic body layer;
 wherein the elastic body layer is composed of a conductive rubber composition containing an isoprene rubber, a rubber other than the isoprene rubber, and carbon black;
 the elastic body layer is phase-separated into a first rubber phase containing the isoprene rubber and a second rubber phase containing the rubber other than the isoprene rubber, wherein the rubber other than the isoprene rubber is an acrylonitrile butadiene rubber; in the range of a 5 μm×5 μm square of an arbitrary cross section of the elastic body layer, the area ratio of the first rubber phase with respect to a total of the first rubber phase and the second rubber phase is within a range of 10 to 90%, the carbon black is eccentrically located in the second rubber phase than in the first rubber phase;
 the resistance value of the elastic body layer is within a range of $1.0\times10^3$ to $1.0\times10^6\Omega$, a surface roughness Sa of the elastic body layer is 0.05 to 1.6 μm;
 the surface layer contains an electronic conductive agent, an associative thickener and a crosslinked body of at least one polyurethane resin of an ether polyurethane resin and a carbonate polyurethane resin, and the glass transition point of the surface layer is within a range of −10 to −70° C., the polyurethane resin of the surface layer is an aqueous polyurethane resin, the associative thickener has a nonionic hydrophilic group and a hydrophobic group consisting of alkyl group, a content of the associated thickener in the composition constituting the surface layer is in a range of 0.5 to 10 parts by mass with respect to 100 parts by mass of the aqueous polyurethane resin,
 the surface layer contains particles for roughness formation, a line roughness Rz at a portion of the surface layer containing the particles for roughness formation is 5.0 to 15.0 μm, and a product Sz·Sm of the surface roughness Sz and the line roughness Sm at a portion of the surface layer that does not contain the particles for roughness formation is 7.5 to 250 μm.

2. A developing roll for an electrophotographic device, comprising:
 a shaft body, an elastic body layer formed on the outer periphery of the shaft body, and a surface layer formed on the outer periphery of the elastic body layer;
 wherein the elastic body layer is composed of a conductive rubber composition containing an isoprene rubber, a rubber other than the isoprene rubber, and carbon black;
 the elastic body layer is phase-separated into a first rubber phase containing the isoprene rubber and a second rubber phase containing the rubber other than the isoprene rubber, wherein the rubber other than the isoprene rubber is an acrylonitrile butadiene rubber; in the range of a 5 μm×5 μm square of an arbitrary cross section of the elastic body layer, the area ratio of the first rubber phase with respect to a total of the first rubber phase and the second rubber phase is within a range of 10 to 90%, the carbon black is eccentrically located in the second rubber phase than in the first rubber phase;
 the resistance value of the elastic body layer is within a range of $1.0\times10^3$ to $1.0\times10^6\Omega$, a surface roughness Sa of the elastic body layer is 0.05 to 1.6 μm;
 the surface layer contains an electronic conductive agent, an associative thickener and a crosslinked body of at least one polyurethane resin of an ether polyurethane resin and a carbonate polyurethane resin, and the glass transition point of the surface layer is within a range of −10 to −70° C., the polyurethane resin of the surface layer is an aqueous polyurethane resin, the associative thickener has a nonionic hydrophilic group and a hydrophobic group consisting of alkyl group, a content of the associated thickener in the composition constituting the surface layer is in a range of 0.5 to 10 parts by mass with respect to 100 parts by mass of the aqueous polyurethane resin,
 the surface layer contains particles for roughness formation, a line roughness Rz at a portion of the surface layer containing the particles for roughness formation is 5.0 to 15.0 μm, and a product Sz·Sm of the surface roughness Sz and the line roughness Sm at a portion of the surface layer that does not contain the particles for roughness formation is 7.5 to 250 μm.

* * * * *